(12) United States Patent
Yoshinaga

(10) Patent No.: US 12,389,873 B2
(45) Date of Patent: Aug. 19, 2025

(54) ANIMAL TOILET

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 99 days.

(21) Appl. No.: 18/124,847

(22) Filed: Mar. 22, 2023

(65) Prior Publication Data

US 2023/0217890 A1 Jul. 13, 2023

Related U.S. Application Data

(63) Continuation of application No. PCT/JP2021/028597, filed on Aug. 2, 2021.

(30) Foreign Application Priority Data

Oct. 23, 2020 (JP) .................................. 2020-177715

(51) Int. Cl.
*A01K 1/01* (2006.01)

(52) U.S. Cl.
CPC .................................. *A01K 1/0114* (2013.01)

(58) Field of Classification Search
CPC .... A01K 1/0114; A01K 1/011; A01K 1/0107; A01K 1/01; A01K 1/0151; A01K 1/015
See application file for complete search history.

(56) References Cited

U.S. PATENT DOCUMENTS

| | | | | |
|---|---|---|---|---|
| 4,217,857 A * | 8/1980 | Geddie | ................ | A01K 1/0114 119/166 |
| 4,505,226 A * | 3/1985 | Carlson | ................ | A01K 1/0114 D30/161 |
| 4,602,593 A * | 7/1986 | Gross | ................... | A01K 1/0107 209/404 |
| 5,325,815 A * | 7/1994 | Gumpesberger | ..... | A01K 1/0114 119/166 |
| 5,797,346 A * | 8/1998 | Lewis | ................... | A01K 1/0114 119/166 |
| 2002/0000205 A1 * | 1/2002 | Yamamoto | ........... | A01K 1/0114 119/161 |
| 2016/0219828 A1 * | 8/2016 | Goerz | ................... | A01K 1/011 |
| 2018/0192610 A1 * | 7/2018 | Petty | ................... | A01K 1/0114 |

FOREIGN PATENT DOCUMENTS

| | | |
|---|---|---|
| CN | 1640246 A | 7/2005 |
| CN | 107094634 A | 8/2017 |
| CN | 108347902 A | 7/2018 |
| JP | 2003-180182 A | 7/2003 |
| JP | 2014-113090 A | 6/2014 |

OTHER PUBLICATIONS

Sep. 14, 2021 International Search Report issued in International Patent Application No. PCT/JP2021/028597.
Sep. 14, 2021 Written Opinion of the International Searching Authority issued in International Patent Application No. PCT/JP2021/028597.
Apr. 28, 2024 Office Action issued in Chinese Patent Application No. 202180045732.0.

* cited by examiner

*Primary Examiner* — Trinh T Nguyen
(74) *Attorney, Agent, or Firm* — Oliff PLC

(57) ABSTRACT

An animal toilet includes a body portion, and a partition portion. The body portion has a bottom face part and a side face part, and is in a box shape. The partition portion has a through hole allowing urine to pass therethrough, and divides the inside of the body portion vertically. The opening area of the through hole is variable.

17 Claims, 15 Drawing Sheets

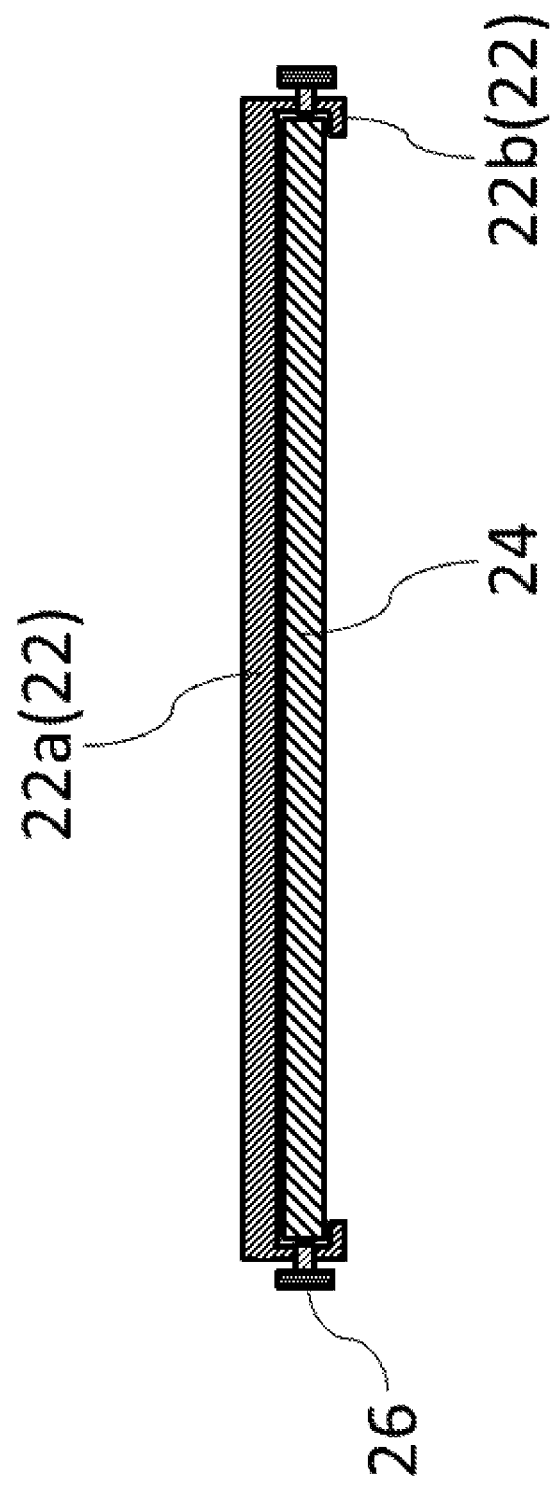

ANIMAL TOILET

CROSS REFERENCE TO RELATED APPLICATION

This is a Continuation of International Application No. PCT/JP2021/028597 filed Aug. 2, 2021, which claims the benefit of Japanese Application No. 2020-177715 filed Oct. 23, 2020. The contents of these applications are hereby incorporated by reference in their entirety.

TECHNICAL FIELD

The present invention relates to an animal toilet.

BACKGROUND ART

A conventional animal toilet is disclosed in, for example, Patent Document 1. The animal toilet disclosed in Patent Document 1 includes a box-shaped body portion, and a partition portion (drainboard) disposed in the body portion. Through holes that allow urine to pass therethrough are formed in the partition portion. The internal space of the body portion is divided into an upper space and a lower space by the partition portion. A plurality of low water absorptive grains are laid in the upper space (on the partition portion). A water-absorbing sheet is disposed in the lower space. In the animal toilet, urine excreted on the grains moves from the upper space to the lower space via the through holes of the partition portion after passing through gaps between the grains.

CITATION LIST

Patent Document

Patent Document 1: JP 2003-180182 A

SUMMARY OF INVENTION

Technical Problem

Enlarging the opening area of the through hole is advantageous for smoothly moving urine from the upper space to the lower space. However, there is a constraint that the through hole should have such a size that the grains on the partition portion cannot pass through the through hole. The particle diameters of grains are different depending on products. Therefore, in the conventional animal toilet, the opening area of the through hole has to be designed a little small so that grains having a small particle diameter cannot pass through the through hole.

Solution to Problem

The present invention has been made in view of the above-described problem, and it is an object thereof to provide an animal toilet that is suitable for smoothly moving urine from an upper space to a lower space.

An animal toilet according to the present invention includes: a body portion that has a bottom face part and a side face part, and is in a box shape; and a partition portion that has a through hole allowing urine to pass therethrough, and divides an inside of the body portion vertically. An opening area of the through hole is variable.

In the animal toilet, the opening area of the through hole is variable. In this case, the opening area of the through hole can be adjusted in accordance with the particle diameter of grains laid on the partition portion. Therefore, urine becomes likely to smoothly move from an upper space to a lower space by enlarging the opening area of the through hole as much as possible in a range where the grains cannot pass through the through hole.

Advantageous Effects of Invention

According to the present invention, it is possible to implement an animal toilet that is suitable for smoothly moving urine from an upper space to a lower space.

BRIEF DESCRIPTION OF DRAWINGS

FIG. 15 is an end view for illustrating a fixing means (fastening tool 26).

DESCRIPTION OF EMBODIMENTS

Figure 1:
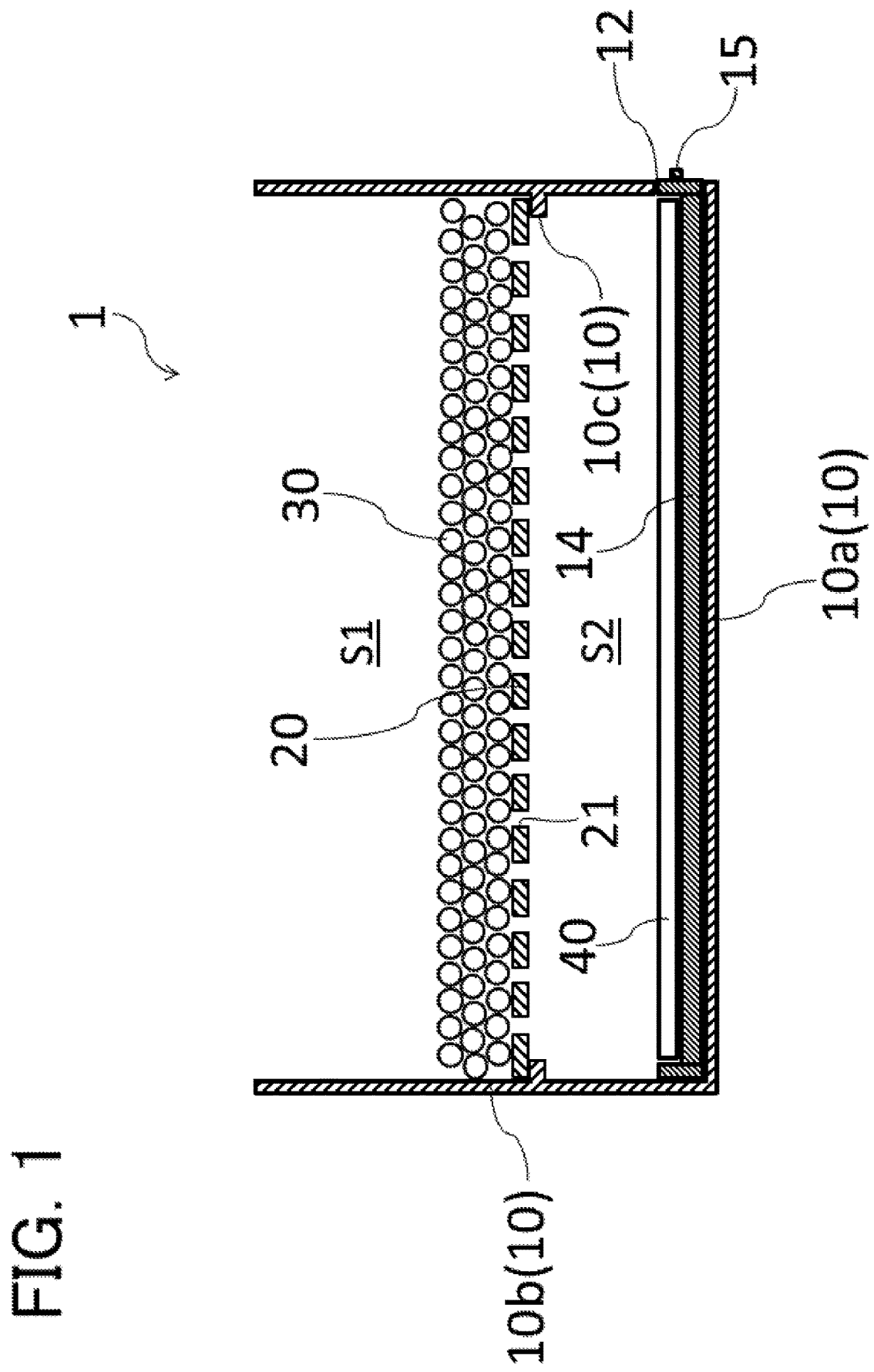
FIG. 1 is an end view showing an embodiment of an animal toilet according to the present invention.

Hereinafter, an embodiment of the present invention will be described in detail with reference to the drawings. In the description of the drawings, the same elements are given the same reference numerals, and a redundant description will be omitted.

FIG. 1 is an end view showing an embodiment of an animal toilet according to the present invention. Referring to FIG. 1, an outline of the constitution of an animal toilet 1 will be described. The animal toilet 1 includes a body portion 10, a drawer portion 14, a partition portion 20, a plurality of grains 30, and a water-absorbing sheet 40. The body portion 10 has a bottom face part 10a and a side face part 10b, and is in a box shape. In the present embodiment, the body portion 10 is in an approximately rectangular parallelepiped shape. As a material of the body portion 10, for example, plastic such as polypropylene or polyethylene can be used.

The body portion 10 has an overhanging part 10c that is provided so as to overhang from the side face part 10b toward the inside of the body portion 10. The overhanging part 10c may be a projection or a projected rim. The overhanging part 10c may be formed integrally with the side face part 10b, or may be attached to the side face part 10b after being formed separately from the side face part 10b. The overhang length of the overhanging part 10c (the length in the direction perpendicular to the inner surface of the side face part 10*b* provided with the overhanging part 10*c*) is, for example, between 5 mm and 15 mm inclusive.

The drawer portion 14 is capable of being inserted in and extracted from the body portion 10 through an opening 12 formed in the side face part 10*b*. The drawer portion 14 houses the water-absorbing sheet 40. As a material of the drawer portion 14, for example, plastic such as polypropylene or polyethylene can be used.

The partition portion 20 is placed on the overhanging part 10*c*. The partition portion 20 is not fixed to the body portion 10. The partition portion 20 is detachable relative to the body portion 10. The partition portion 20 is in an approximate plate shape, and arranged in parallel with the bottom face part 10*a*. The partition portion 20 is provided at a position apart from both the water-absorbing sheet 40 and the upper end of the body portion 10. Thus, the partition portion 20 divides the inside of the body portion 10 vertically. That is, the internal space of the body portion 10 is divided into an upper space S1 and a lower space S2 by the partition portion 20. The partition portion 20 has a through hole 21 that allows urine to pass through the through hole 21. As a material of the partition portion 20, for example, plastic such as polypropylene or polyethylene can be used. Note that detail constitution of the partition portion 20 is omitted in FIG. 1. The detail constitution of the partition portion 20 will be described later.

The plurality of grains 30 are disposed in the body portion 10. In the descriptions below, "plurality of grains 30" refers to all of the grains 30 disposed in the body portion 10 unless otherwise indicated. The plurality of grains 30 are disposed in the body portion 10 in a state of being laid on the partition portion 20. When the animal toilet 1 is used, the grains 30 directly receive excreted urine. The grains 30 have a water-repellent property. That is, the grains 30 have the property of not absorbing liquid such as urine at all, or hardly absorbing it.

The grains 30 having the water-repellent property require the water-repellent rate of 80% or more measured by the following test. First, approximate 50 grams of the grains 30 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the water-repellent rate. That is, if the water quantity in the beaker is 24 ml or more, the water-repellent rate is 80% or more, and therefore the grains 30 are found to have the water-repellent property. For reference, the water-repellent rate of general water-absorbing cat litter, which is commercially available, is about 5%.

The grains 30 are each formed in a granular shape. Examples of the granular shape include a sphere, column, and ellipsoid. The particle diameter of the grain 30 is, for example, between 5 mm and 20 mm inclusive. The particle diameter of each grain 30 is preferably larger than 15 mm. As used herein, the particle diameter is defined as the diameter of the minimum sphere that can include the grain 30. The grain 30 preferably contains an organic substance as its main material. As used herein, the main material refers to the material that accounts for the highest weight ratio in the grain 30, out of one or more materials constituting the grain 30. As the organic substance, for example, papers, used tea leaves, plastics, or bean curd lees can be used.

The papers refer to a material composed mainly of pulp. Examples of the papers include, in addition to ordinary paper, a vinyl chloride wallpaper classified product, photographic paper, release paper, fluff pulp, papermaking sludge, and pulp sludge. The vinyl chloride wallpaper classified product is obtained by removing part of polyvinyl chloride from vinyl chloride wallpaper containing paper and polyvinyl chloride. Examples of the plastics include, in addition to ordinary plastic, an aluminum deposited film, and a disposable diaper classified product (plastic obtained by classifying disposable diapers). The bean curd lees are preferably dried bean curd lees. These materials may be subjected to water repellency treatment.

The material(s) constituting the grain 30 may be only one material, or two or more materials. In the former case, the main material described above is the only material constituting the grain 30. In the latter case, the grain 30 is made of a mixture of the main material and other material(s). Gypsum is an example of the other material. Adding gypsum can enhance the water-repellent property of the grain 30. The quantity of gypsum is, for example, between 5 wt. % and 15 wt. % inclusive with respect to the entirety of the grain 30.

The grains 30 can be manufactured by, for example, the following method. First, granules constituting the grains 30 are formed by granulating a granulating material (the material(s) constituting the grains 30) with a granulation apparatus. As the granulation apparatus, for example, an extrusion granulator can be used. The granules may be subjected to water repellency treatment as needed. The water repellency treatment can be performed by, for example, coating the surfaces of the granules with a water repellent agent. In the case where the water repellency treatment is not performed, it is preferable that crevices are prevented from forming in the granules as much as possible by increasing the pressure that is applied to the granulating material during granulation. This is because the crevices serve as a path through which moisture such as urine enters inside the grains 30. Prior to the granulation, pretreatment such as pulverization, kneading, and adding water is performed on the granulating material as needed. Also, after the granulation, posttreatment such as sieving (sizing), and drying is performed as needed.

The water-absorbing sheet 40 is disposed under the partition portion 20. In the present embodiment, the water-absorbing sheet 40 is disposed in the body portion 10 in a state of being housed in the drawer portion 14. The water-absorbing sheet 40 absorbs urine that has passed through the through hole 21 of the partition portion 20.

When the animal toilet 1 is used, urine excreted on the grains 30 flows downward while winding its way through gaps between the adjacent grains 30. The urine moves from the upper space S1 to the lower space S2 via the through hole 21 of the partition portion 20, and then is absorbed by the water absorbing sheet 40.

Figure 2:
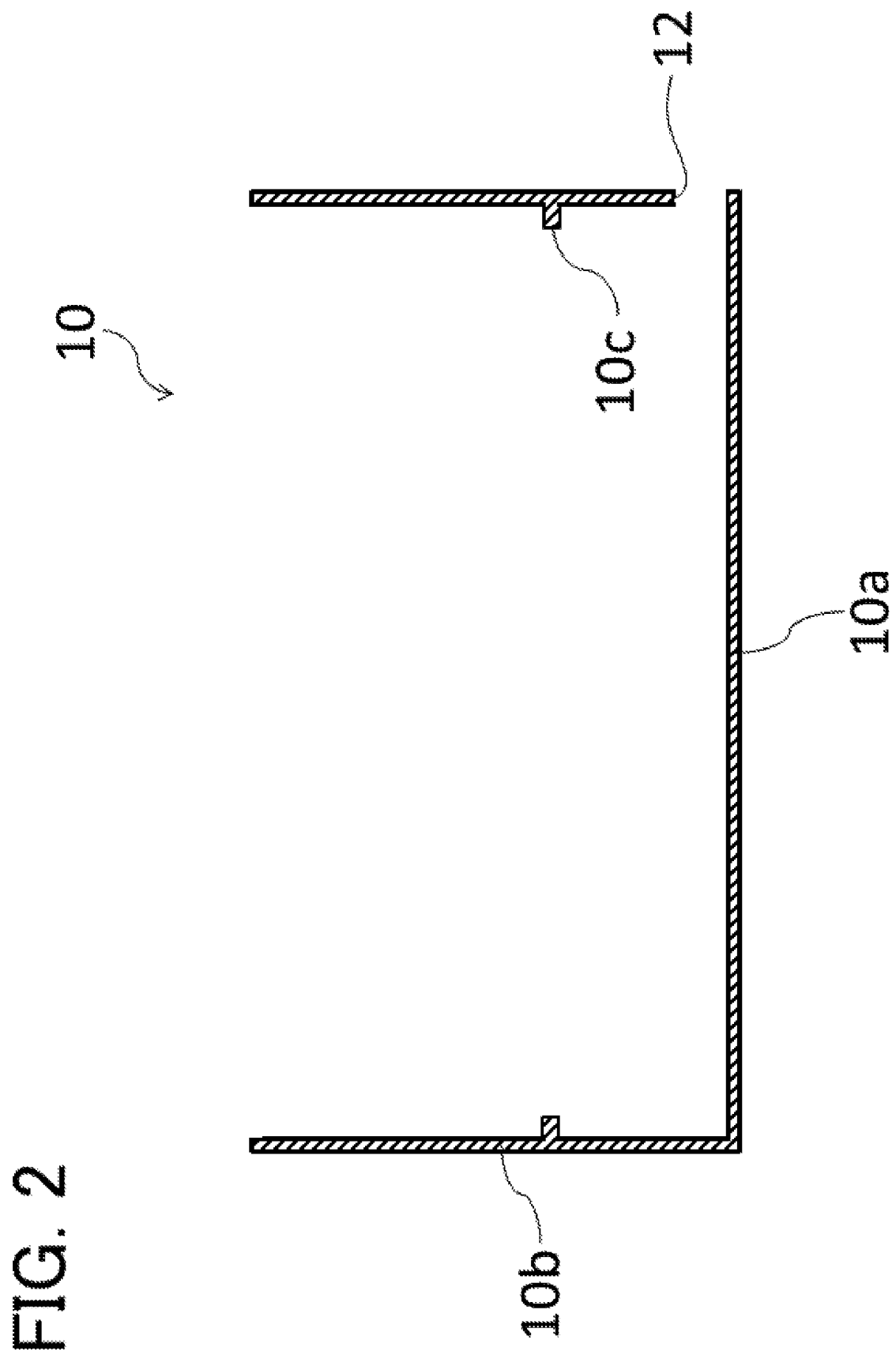
FIG. 2 is an end view showing a body portion 10.
Figure 3:
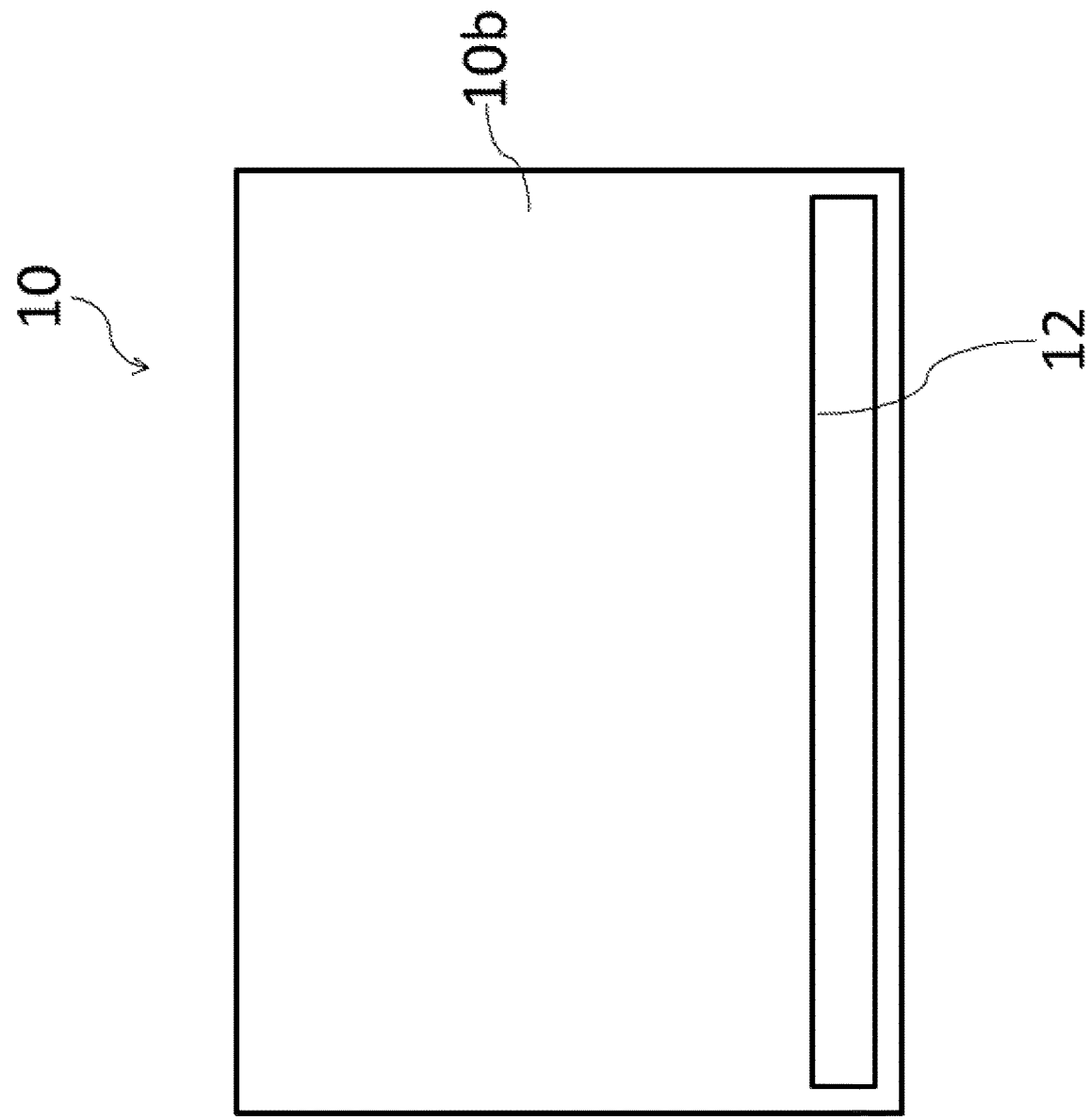
FIG. 3 is a front view showing the body portion 10.
Figure 4:
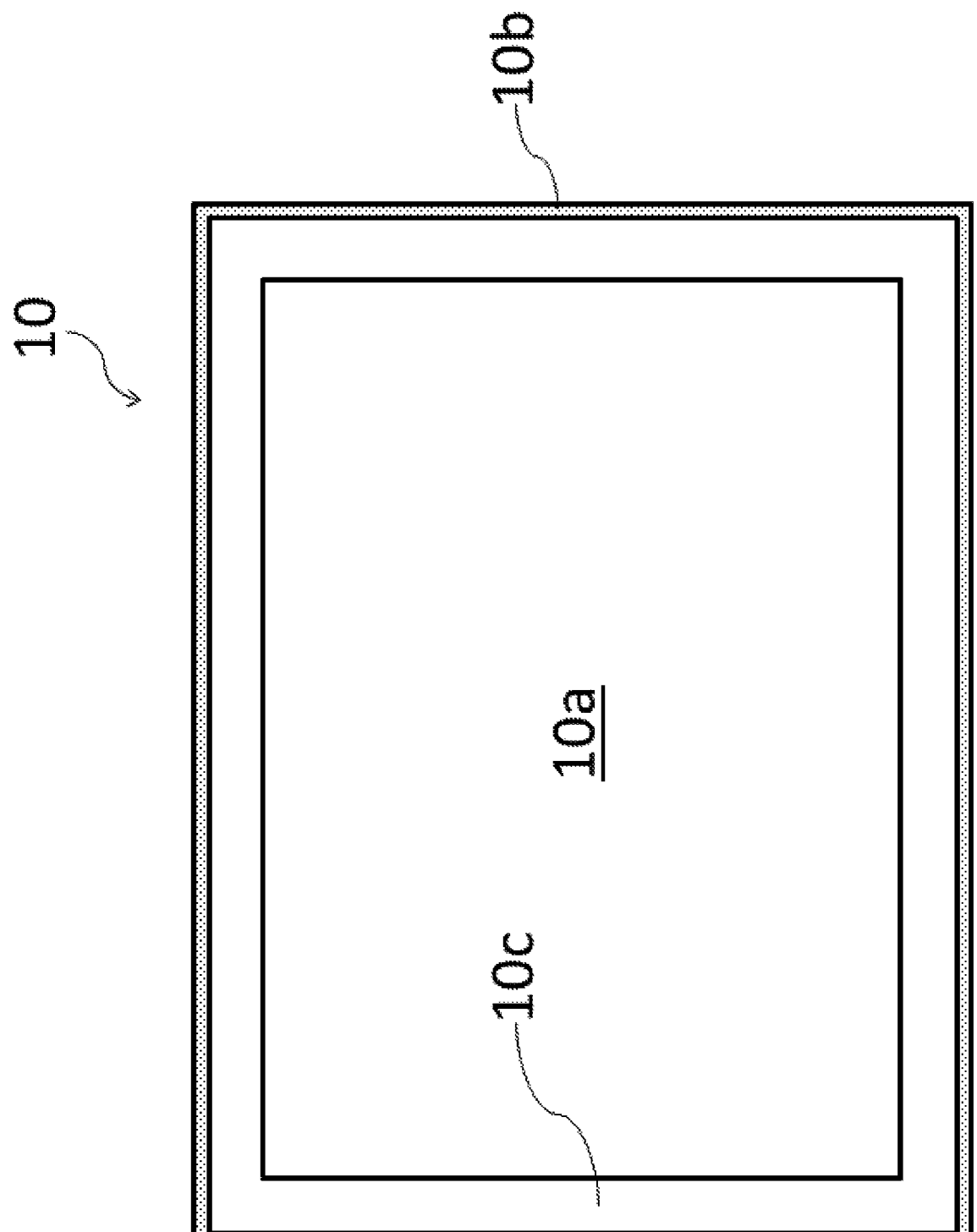
FIG. 4 is a plan view showing the body portion 10.

Hereinafter, referring to FIG. 2 to FIG. 14, the constitution of each portion of the animal toilet 1 will be described in detail. FIG. 2, FIG. 3 and FIG. 4 are, respectively, an end view, a front view and a plan view showing the body portion 10. As shown in FIG. 2 and FIG. 3, the opening 12 for inserting and extracting the drawer portion 14 is formed in the side face part 10*b* of the body portion 10. The opening 12 is located near the bottom face part 10*a*, and in a horizontally long rectangular shape. The length in the horizontal direction (right/left direction in FIG. 3) of the opening 12 is nearly equal to the breadth of the inside of the body portion 10, and is, for example, between 20 cm and 40 cm inclusive. The length in the vertical direction (top/bottom direction in FIG. 3) of the opening 12 is, for example, between 2 cm and 5 cm inclusive. Also, as shown in FIG. 4, the overhanging part 10c is composed of a projected rim that is provided annularly over the entirety of the inner surface of the side face part 10b in plan view in the present embodiment.

Figure 5:
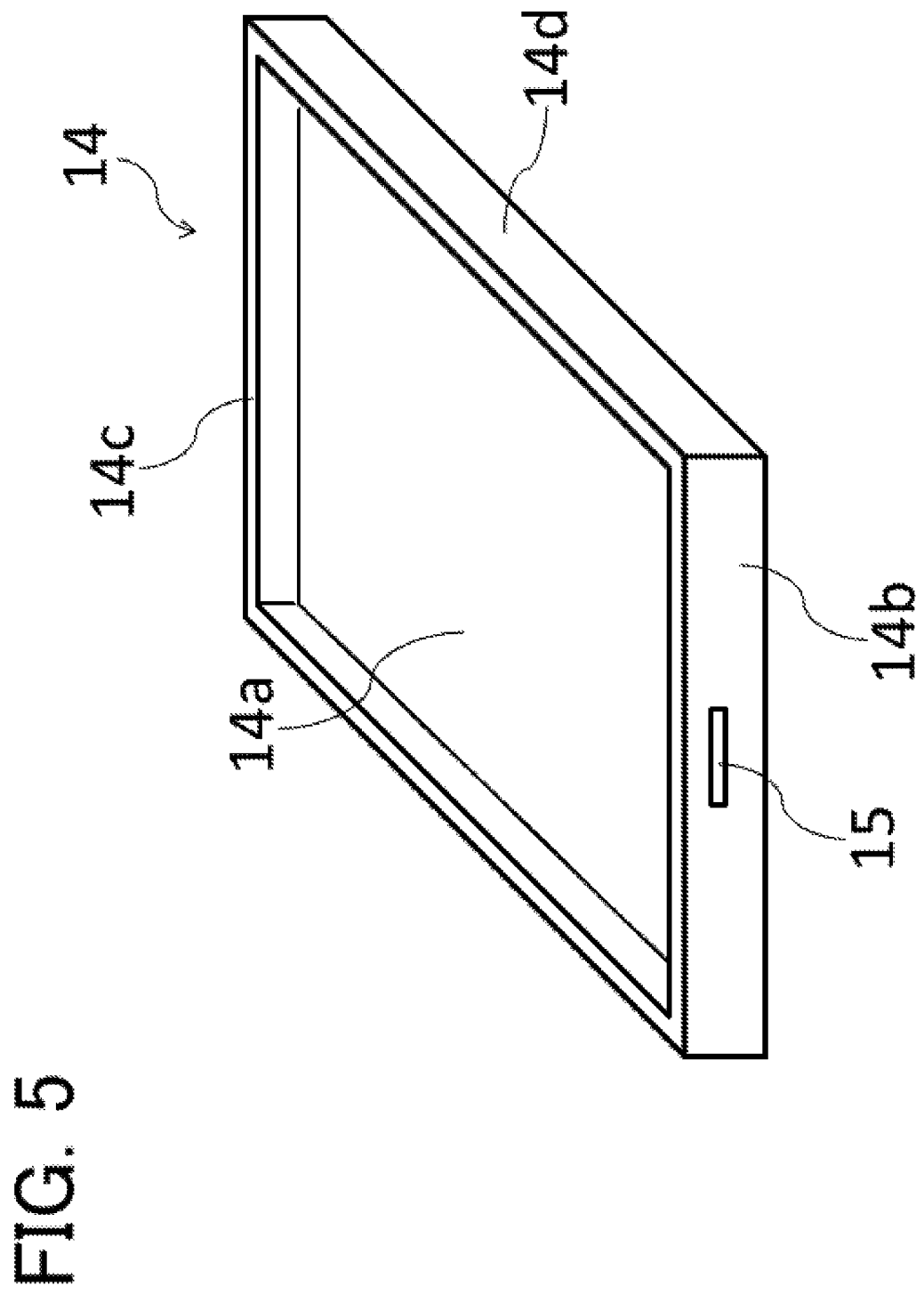
FIG. 5 is a perspective view showing a drawer portion 14.

FIG. 5 is a perspective view showing the drawer portion 14. The drawer portion 14 has a bottom board 14a, a front board 14b, a rear board 14c, and a pair of side boards 14d. The size of the bottom board 14a is nearly equal to the size of the bottom face part 10a of the body portion 10. The front board 14b has nearly the same shape and size as the opening 12. A grip 15 is attached to the front board 14b.

Figure 6:
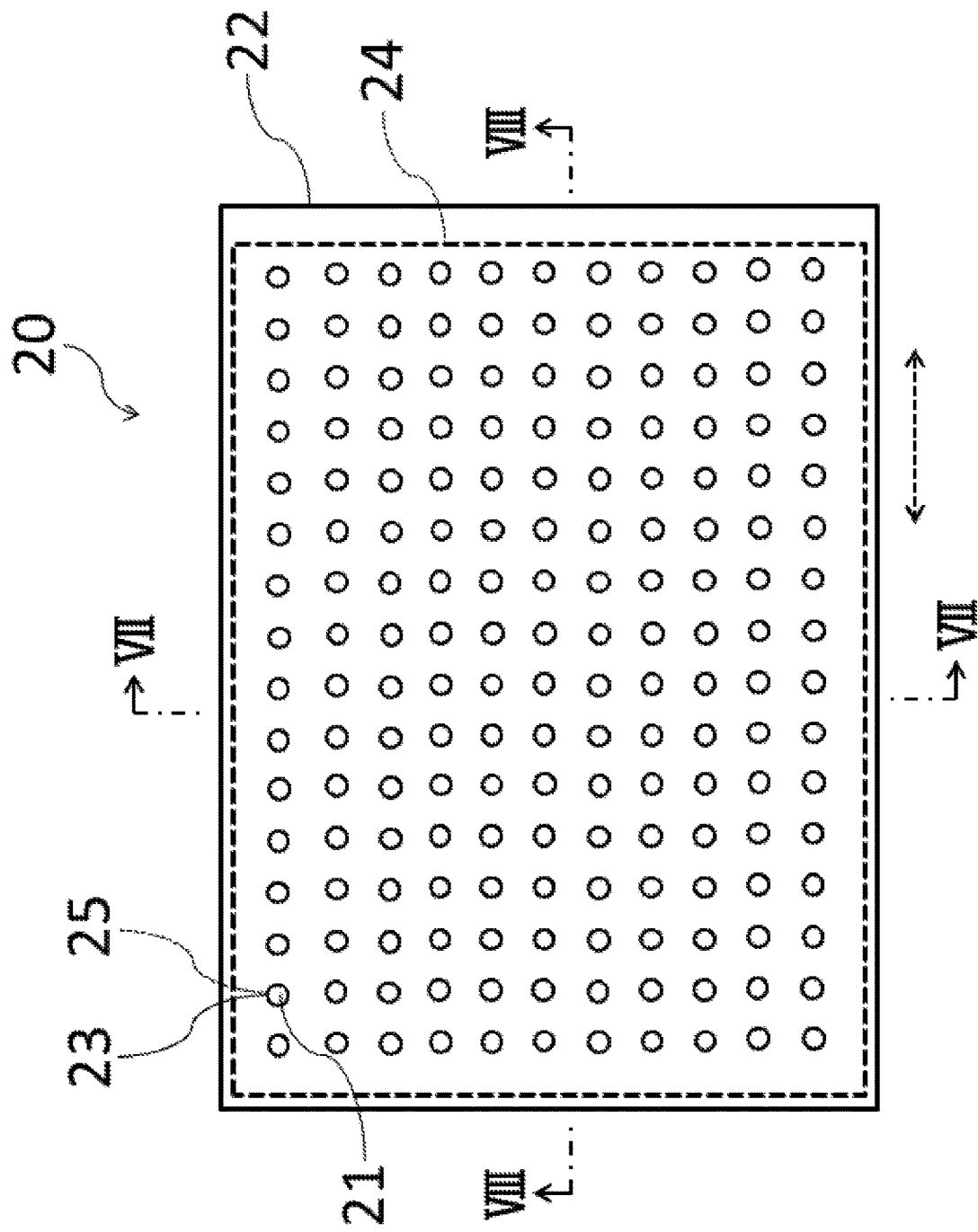
FIG. 6 is a plan view showing a partition portion 20.
Figure 7:
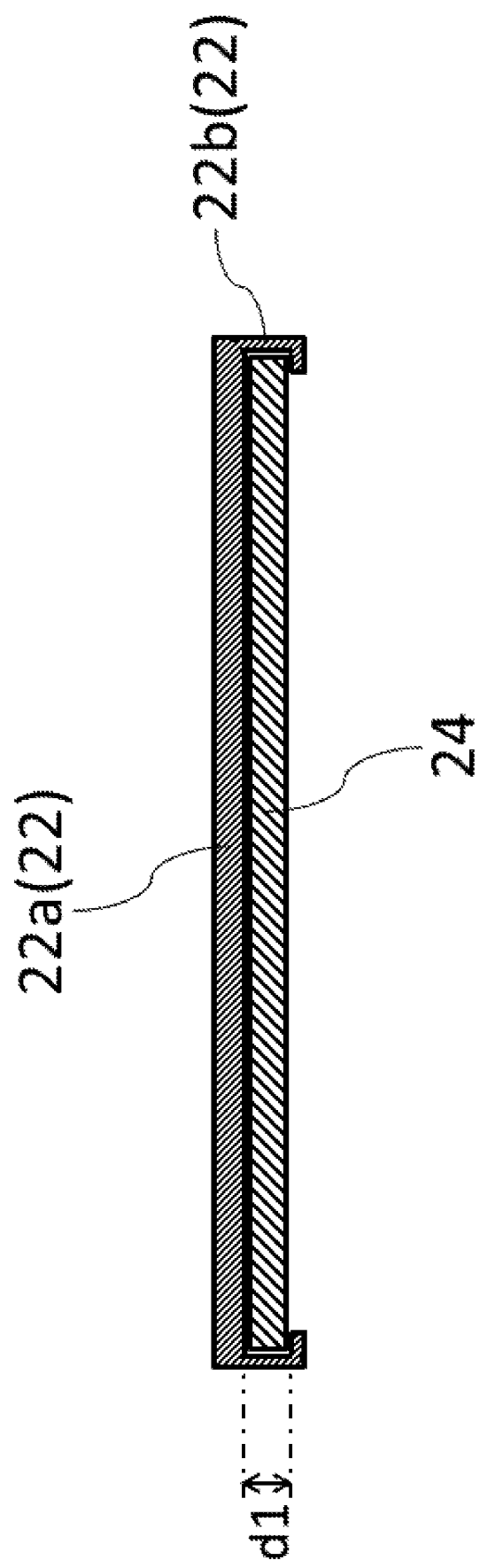
FIG. 7 is an end view taken along line VII-VII in FIG. 6.
Figure 8:
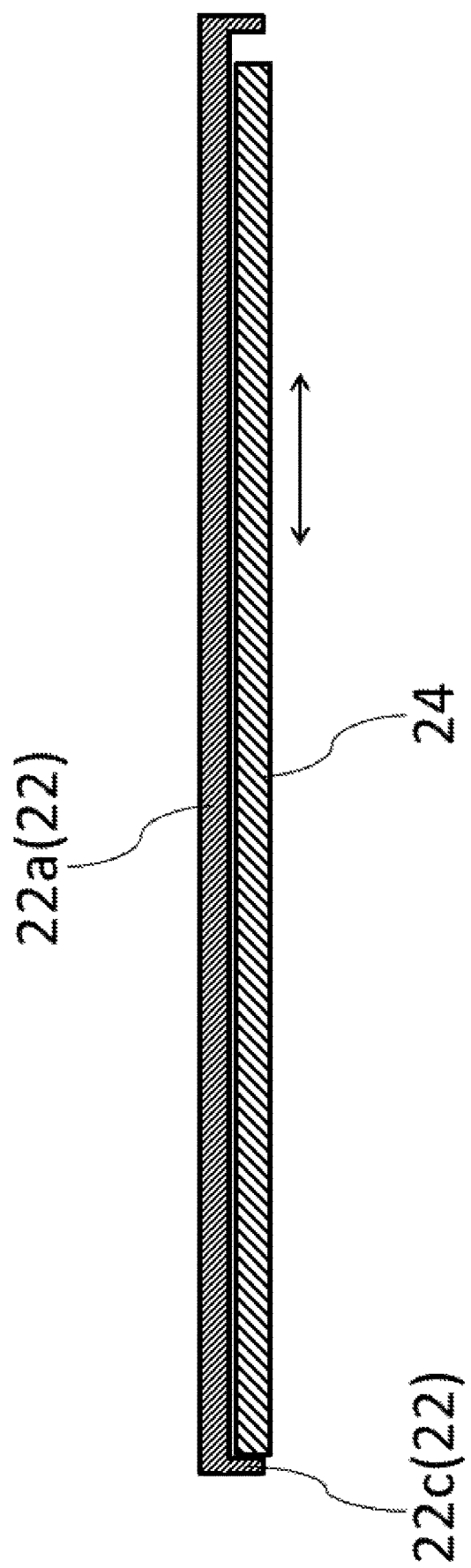
FIG. 8 is an end view taken along line VIII-VIII in FIG. 6.

FIG. 6 is a plan view showing the partition portion 20. Also, FIG. 7 and FIG. 8 are end views taken along line VII-VII and line VIII-VIII in FIG. 6, respectively. A plurality of the through holes 21 are present in the partition portion 20. The plurality of through holes 21 are arranged two-dimensionally in the partition portion 20. The through holes 21 allow urine to pass therethrough, whereas the through holes 21 do not allow the grain 30 to pass therethrough.

The opening area of each through hole 21 is variable. As used herein, the opening area refers to the area of the opening part of each through hole 21 in plan view. The maximum value of the opening area of each through hole 21 is preferably between 2 times and 10 times inclusive, and more preferably between 3 times and 10 times inclusive of the minimum value of the opening area. Also, the maximum value of the diameter of each through hole 21 is preferably between 1 cm and 2 cm inclusive, and the minimum value of the diameter of each through hole 21 is preferably between 1 mm and 2 mm inclusive. As used herein, the diameter of each through hole 21 is defined as the diameter of the maximum circle that can be included in the opening part of the through hole 21 in plan view.

The partition portion 20 includes a member 22 (first member) and a member 24 (second member). The member 22 is in an approximately rectangular shape in plan view (see FIG. 6). As used herein, "approximately rectangular shape" means that the shape includes not only a rectangle but also a shape similar to a rectangle such as a round corner rectangle. A hole 23 (first hole) that constitutes the through hole 21 is formed in the member 22. The member 24 is in a plate shape, and in an approximately rectangular shape in plan view. The thickness of the member 24 is, for example, between 3 mm and 10 mm inclusive. A hole 25 (second hole) that constitutes the through hole 21 together with the hole 23 is formed in the member 24. The member 22 and the member 24 overlap with each other. The member 24 overlaps with the member 22 such that the hole 25 is located under the hole 23. The member 24 does not protrude from the member 22 in plan view. The member 24 is smaller than the member 22 in plan view. That is, the entirety of the member 24 overlaps with a part of the member 22.

The member 24 is displaceable relative to the member 22 in a state of overlapping with the member 22. That is, the member 24 is configured to be able to move relatively to the member 22 in a plane parallel to the plate face of the member 24. In the present embodiment, the member 24 is displaceable relative to the member 22 in only one direction. Specifically, the member 24 is displaceable in only its longitudinal direction (the direction shown by the arrow in FIG. 6 and FIG. 8). That is, the above-described one direction is equal to the longitudinal direction of the member 24.

The member 22 has a plate-shaped part 22a and a support part 22b (see FIG. 7). The plate-shaped part 22a is a part in a plate shape in which the hole 23 is formed. The bottom surface of the plate-shaped part 22a faces the top surface of the member 24. The thickness of the plate-shaped part 22a is, for example, between 3 mm and 10 mm inclusive. The support part 22b is continuous with the plate-shaped part 22a, and supports the member 24. In detail, the support part 22b supports the member 24 such that the support part 22b covers the member 24 from the side surface of the member 24 to a non-facing surface. As used herein, the non-facing surface of the member 24 refers to the surface opposite to the surface facing the member 22. In the present embodiment, the bottom surface of the member 24 corresponds to the non-facing surface. However, the support part 22b covers only a peripheral part of the member 24 in which the hole 25 is not formed so as not to overlap with the hole 25. The support part 22b is in a hook shape (L-shape in cross section).

The support part 22b is connected only to the long side, out of the long side and the short side of the plate-shaped part 22a. The support part 22b is connected to both of the two long sides of the plate-shaped part 22a. The support part 22b may be provided to the entirety or only a part of each long side of the plate-shaped part 22a. The support part 22b may be formed integrally with the plate-shaped part 22a, or may be attached to the plate-shaped part 22a after being formed separately from the plate-shaped part 22a. The interval d1 between the plate-shaped part 22a and the tip of the support part 22b is designed slightly larger than the thickness of the member 24 so that the member 24 can slide in the longitudinal direction in a state of being supported by the support part 22b.

The partition portion 20 includes a limitation means for limiting the movable range of the member 24 relative to the member 22. In the present embodiment, the member 22 is provided with a projecting part 22c as the limitation means (see FIG. 8). The projecting part 22c is continuous with the plate-shaped part 22a, and projects from an edge part of the member 22 toward the member 24. The projecting part 22c is connected only to the short side, out of the long side and the short side of the plate-shaped part 22a. The projecting part 22c is connected to both of the two short sides of the plate-shaped part 22a. The projecting part 22c may be provided to the entirety or only a part of each short side of the plate-shaped part 22a. The projecting part 22c may be formed integrally with the plate-shaped part 22a, or may be attached to the plate-shaped part 22a after being formed separately from the plate-shaped part 22a.

Displacement of the member 24 is regulated by the projecting part 22c due to the side surface of the member 24 coming into contact with the projecting part 22c. Therefore, the movable range of the member 24 is limited to the region between the projecting part 22c provided to one short side of the plate-shaped part 22a and the projecting part 22c provided to the other short side. The member 24 does not protrude from the member 22 in plan view with respect to the entirety of the movable range.

Figure 9:
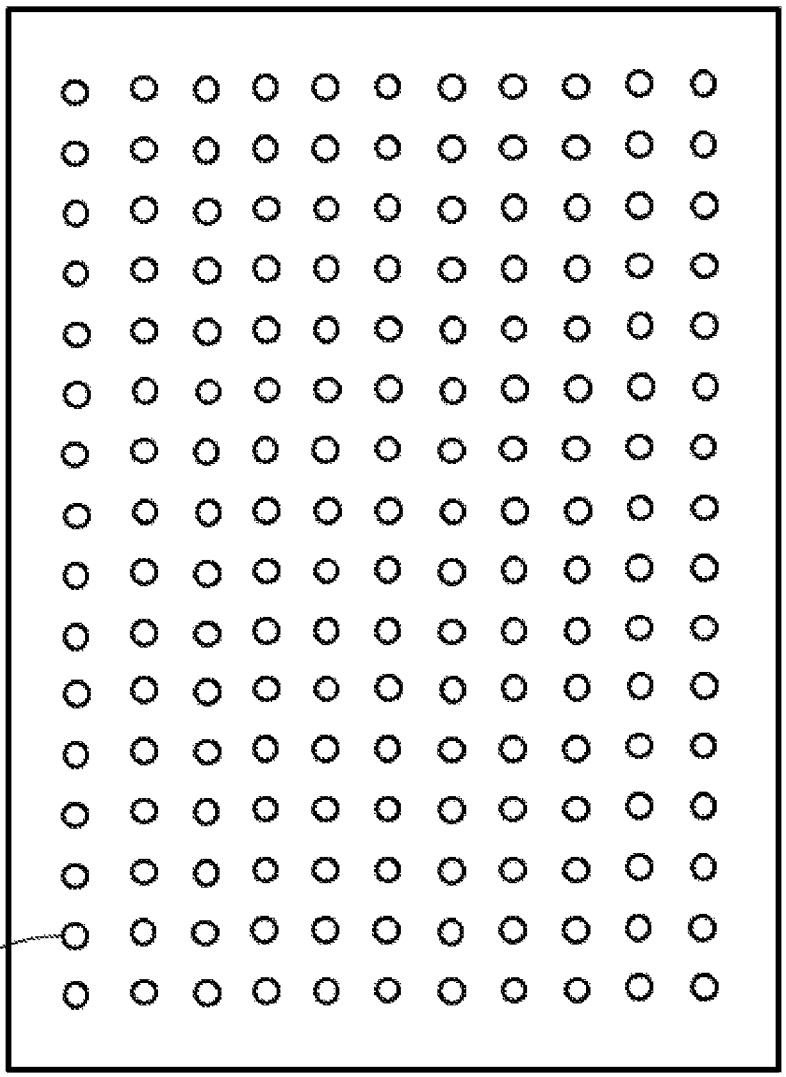
FIG. 9 is a plan view showing a member 22.
Figure 10:
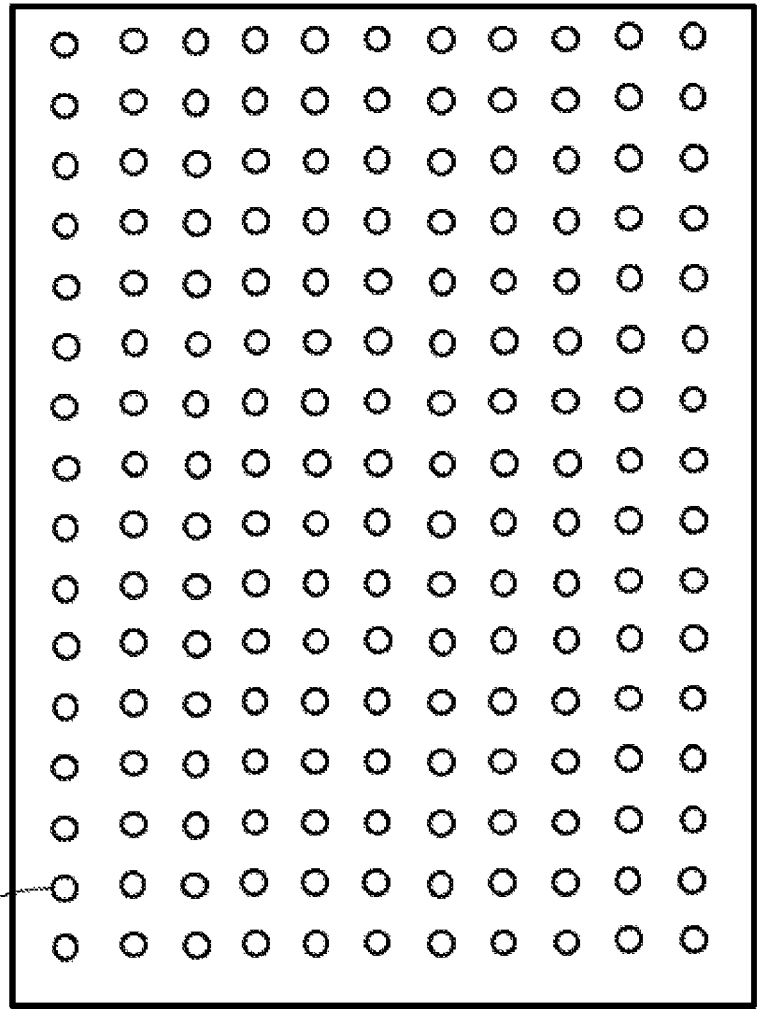
FIG. 10 is a plan view showing a member 24.

FIG. 9 and FIG. 10 are plan views showing the member 22 and the member 24, respectively. The member 22 has n holes 23 (n represents an integer of 2 or more). Here, the case where n=176 is exemplified. The member 24 has n holes 25. That is, the number of the holes 23 and the number of the holes 25 are equal to each other. The plan shape of the hole 23 is a circle. The plan shape of the hole 25 is a circle congruent with the plan shape of the hole 23. Also, the arrangement pattern of the holes 23 in the member 22 and the arrangement pattern of the holes 25 in the member 24 are the same so that all holes 23 and all holes 25 can completely overlap with each other simultaneously. These holes 23 and holes 25 form n through holes 21 in the partition portion 20.

Figure 11:
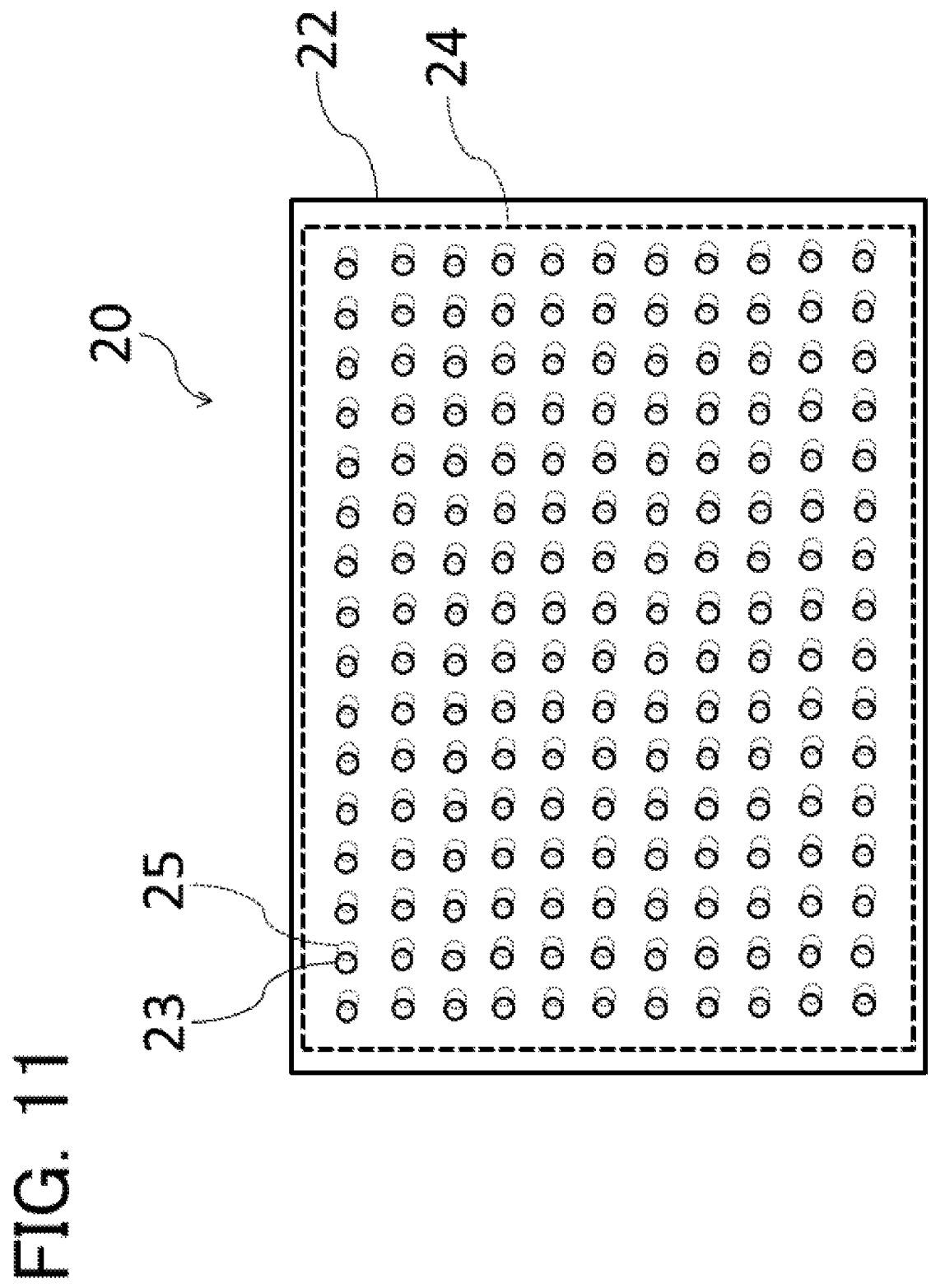
FIG. 11 is a plan view for illustrating the constitution of the partition portion 20.
Figure 12:
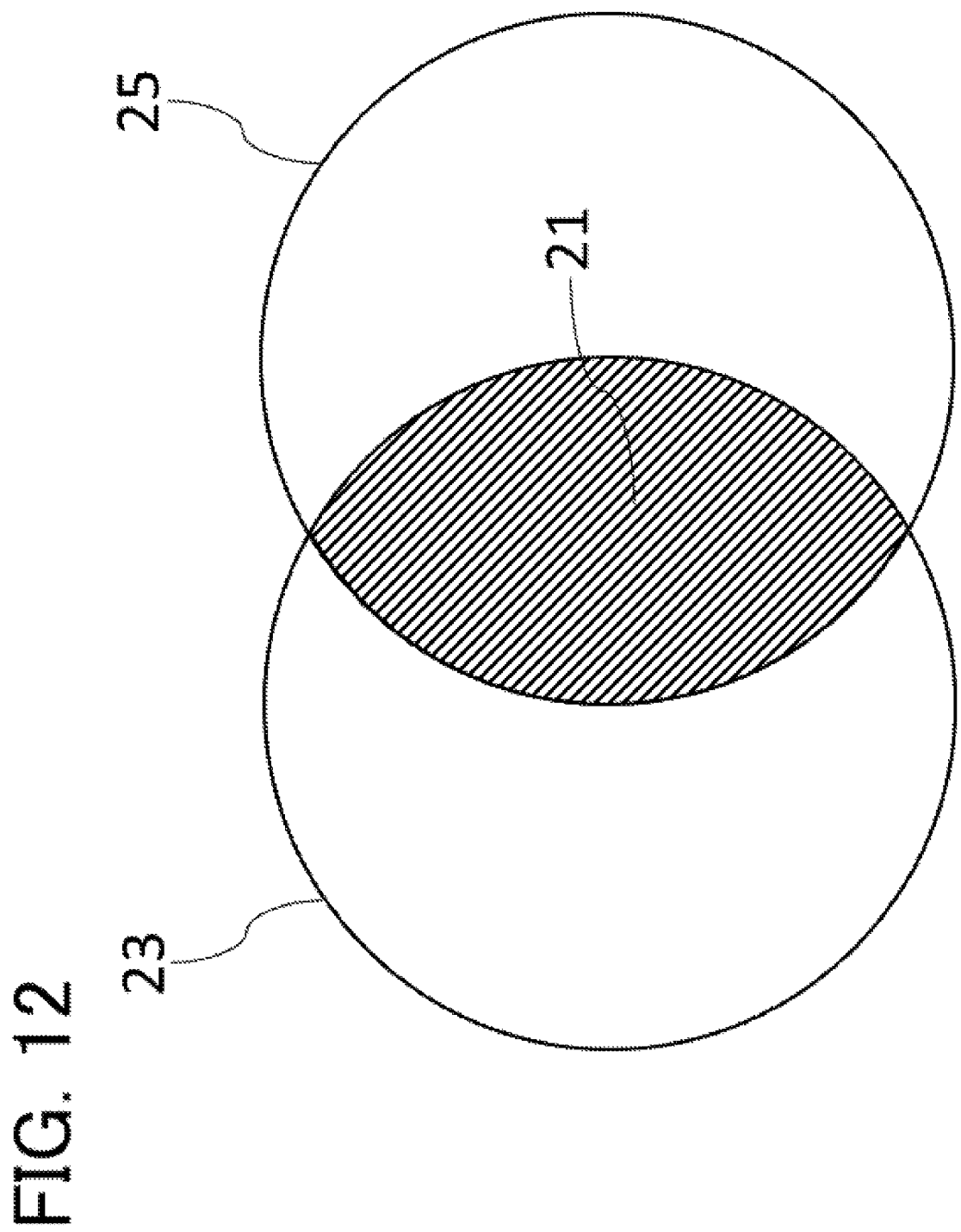
FIG. 12 is a diagram for illustrating the opening area of a through hole 21.

In the present embodiment, when the side surface (the side surface on the left side in FIG. 8) of the member 24 is in contact with one projecting part 22c (the projecting part 22c on the left side in FIG. 8), each hole 23 and each hole 25 completely overlap with each other, and thus the opening area of the through hole 21 becomes maximum (see FIG. 6). As shown in FIG. 11, when the member 24 is displaced so as to approach the other projecting part 22c (the projecting part 22c on the right side in FIG. 8), each hole 23 and each hole 25 partially overlap with each other, and thus the opening area of the through hole 21 becomes smaller. At this time, as shown in FIG. 12, the area of a part (hatched part) in which the hole 23 and the hole 25 overlap with each other in plan view is the opening area of the through hole 21.

Figure 13:
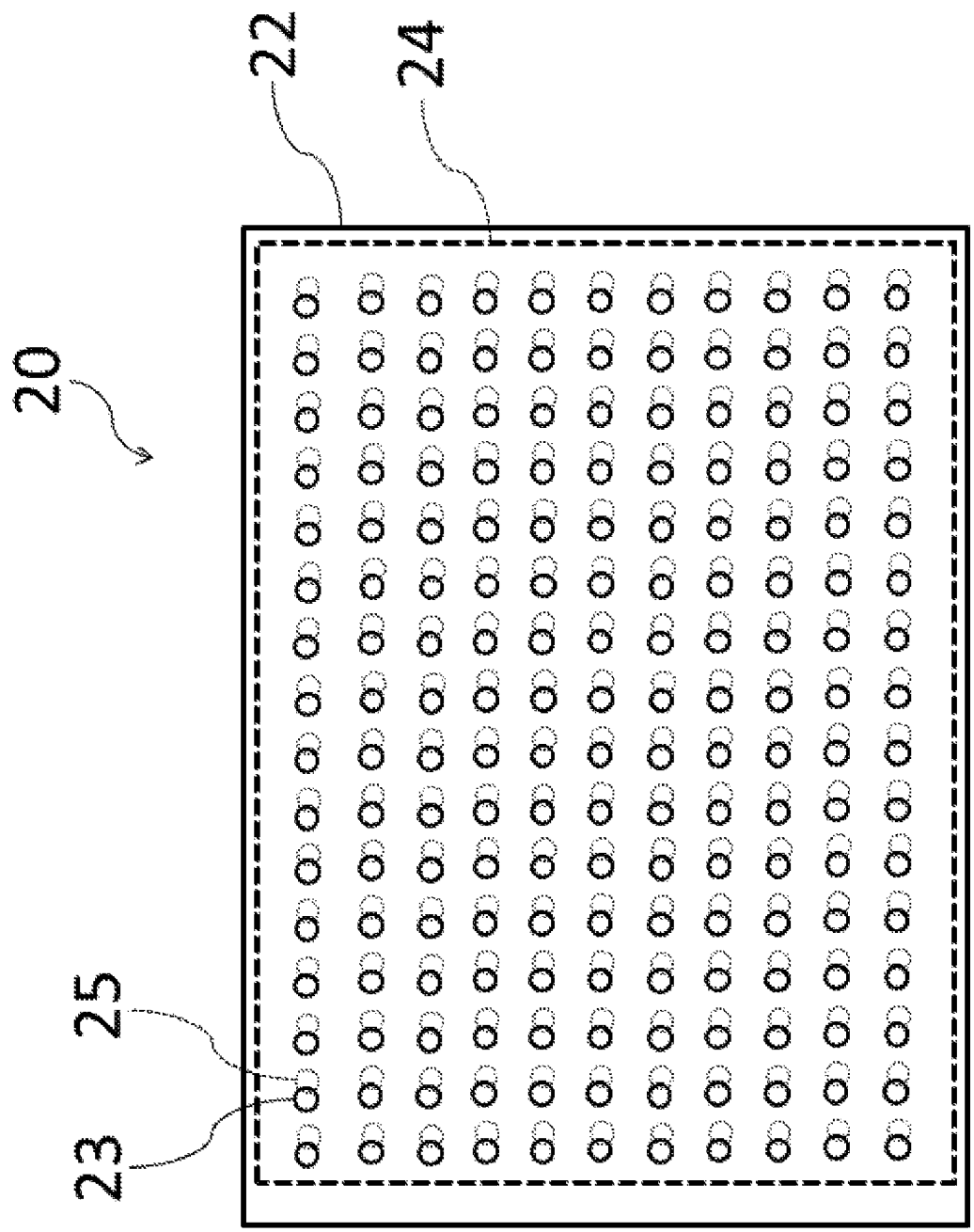
FIG. 13 is a plan view for illustrating the constitution of the partition portion 20.
Figure 14:
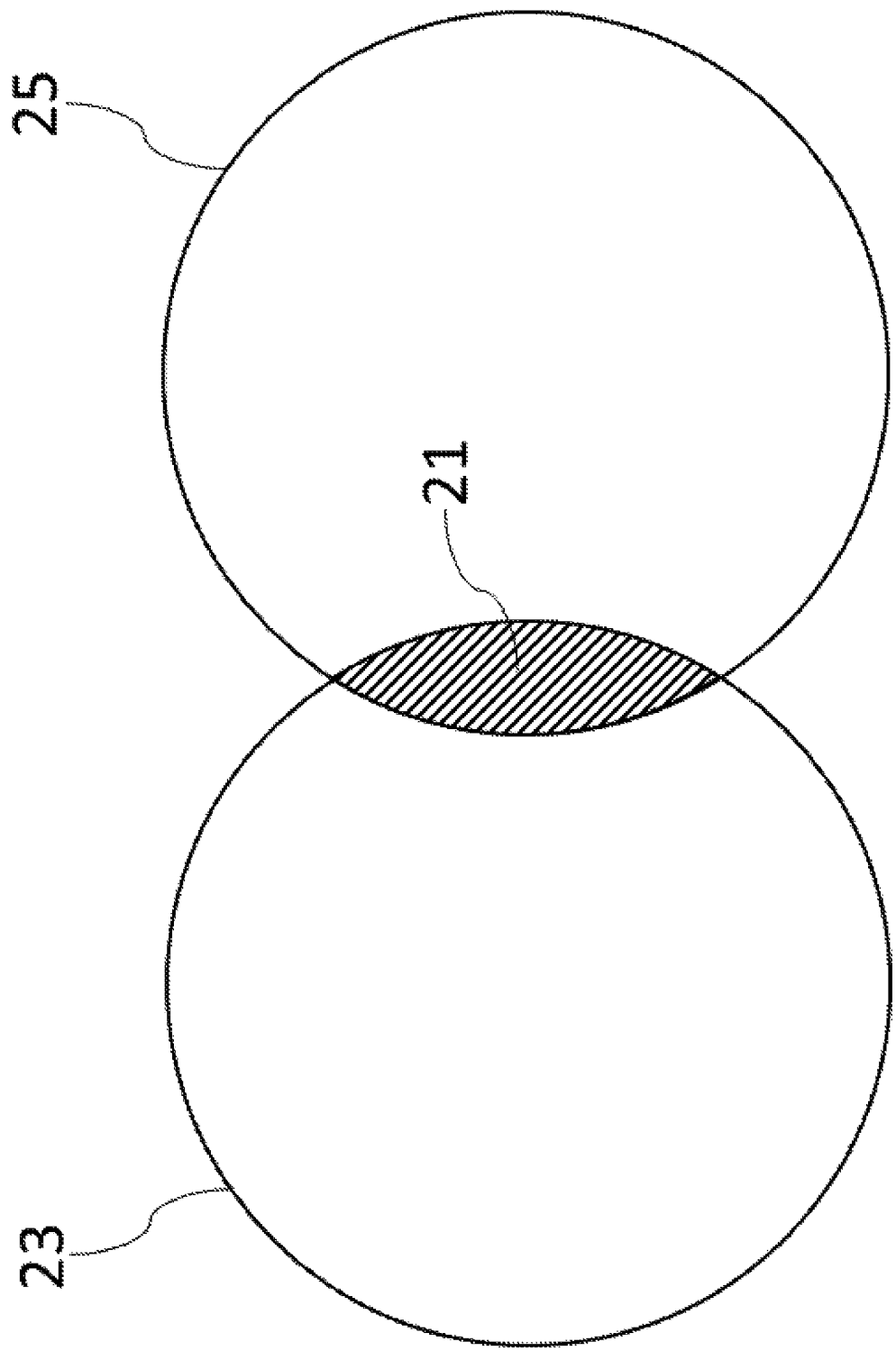
FIG. 14 is a diagram for illustrating the opening area of the through hole 21.

Moreover, as shown in FIG. 13 and FIG. 14, when the side surface (the side surface on the right side in FIG. 8) of the member 24 is in contact with the other projecting part 22c, the area of the part in which the hole 23 and the hole 25 overlap with each other, namely the opening area of the through hole 21 becomes minimum. However, because a part of each hole 23 and a part of each hole 25 still partially overlap with each other at that time, the minimum value of the opening area of the through hole 21 is not zero. In this way, the partition portion 20 is configured such that at least a part of each hole 23 and at least a part of each hole 25 overlap with each other with respect to the entirety of the movable range of the member 24.

The effects of the animal toilet 1 will be described. In the animal toilet 1, the opening area of the through hole 21 is variable. In this case, the opening area of the through hole 21 can be adjusted in accordance with the particle diameter of the grains 30 laid on the partition portion 20. Therefore, urine becomes likely to smoothly move from the upper space S1 to the lower space S2 by enlarging the opening area of the through hole 21 as much as possible in a range where the grains 30 cannot pass through the through hole 21. Accordingly, the animal toilet 1 is implemented that is suitable for smoothly moving urine from the upper space S1 to the lower space S2.

It is preferable that the variable range of the size of the through hole 21 is wider in order to adapt to grains 30 having various particle diameters. From this viewpoint, the maximum value of the opening area of the through hole 21 is preferably 2 times or more, and more preferably 3 times or more of the minimum value of the opening area. From the same viewpoint, the maximum value of the diameter of the through hole 21 is preferably 1 cm or more, and the minimum value of the diameter of the through hole 21 is preferably 2 mm or less.

The partition portion 20 includes the member 22 in which the hole 23 is formed, and the member 24 in which the hole 25 that constitutes the through hole 21 together with the hole 23 is formed. In this case, the opening area of the through hole 21 is determined by the extent to which the hole 23 and the hole 25 overlap with each other. Therefore, the opening area of the through hole 21 can be adjusted only by displacing the member 24 relative to the member 22.

The member 24 is displaceable relative to the member 22 in only one direction. Limiting the displaceable direction to one direction in this way makes it possible to realize the partition portion 20 in which the member 24 is displaceable relative to the member 22 with simple constitution.

The one direction is equal to the longitudinal direction of the member 24. Matching the displaceable direction with a side direction (longitudinal direction or short-length direction) of the member 24 in this way is also advantageous for simplifying the constitution of the partition portion 20.

The member 24 does not protrude from the member 22 in plan view. In this case, because the gap between the member 22 and the side face part 10b of the body portion 10 can be reduced, it is possible to make a situation less likely to occur in which the grains 30 get caught in the gap. In contrast, in a case where the member 24 protrudes from the member 22 in plan view, a large gap has to be provided between the member 22 and the side face part 10b so that a protruding part of the member 24 can be housed in the body portion 10 as well. For that reason, the grains 30 are likely to get caught in the gap.

The member 24 is smaller than the member 22 in plan view. Thus, the movable range of the member 24 can be secured while preventing the member 24 from protruding from the member 22.

The member 22 has the support part 22b that supports the member 24 in addition to the plate-shaped part 22a. Thus, it is possible to maintain the state in which the member 24 overlaps with the member 22 without using another member (a member other than the member 22 or the member 24).

The support part 22b supports the member 24 such that the support part 22b covers the member 24 from the side surface of the member 24 to the non-facing surface. Thus, it is possible to realize the support part 22b that supports the member 24 with simple constitution.

The partition portion 20 includes the limitation means for limiting the movable range of the member 24 relative to the member 22. Thus, the opening area of the through hole 21 can be easily adjusted, because the member 24 is prevented from being displaced relative to the member 22 more than necessary.

The above-described limitation means is the projecting part 22c that projects from the edge part of the member 22 toward the member 24. Thus, it is possible to realize the limitation means for limiting the movable range of the member 24 with simple constitution.

There are n holes 23 and n holes 25 that constitute n through holes 21. In the case where the holes 23 and the holes 25 correspond one-to-one to each other in this way, the arrangement patterns thereof can be the same. This contributes to reduction in manufacturing costs of the partition portion 20 and eventually the animal toilet 1.

The partition portion 20 is not fixed to the body portion 10. In this case, the partition portion 20 can be attached to and detached from the body portion 10 easily. For this reason, it is possible to easily carry out the work of detaching the partition portion 20 from the body portion 10 and adjusting the opening area of the through hole 21.

The partition portion 20 is placed on the overhanging part 10c. Thus, the partition portion 20 can stay at a predetermined position in the body portion 10 without being fixed to the body portion 10.

The inside of the body portion 10 is divided by the partition portion 20 vertically, and the plurality of grains 30 are disposed on the partition portion 20. Thus, it is possible to separate the space (the upper space S1) in which the grains 30 are disposed, and the space (the lower space S2) in which urine accumulates. For this reason, the grains 30 can be prevented from coming in contact with the urine accumulating in the body portion 10 (including the urine absorbed by the water-absorbing sheet 40).

In the case where the grains 30 with a large particle diameter (a particle diameter more than 15 mm) are used, the animal toilet 1 is particularly useful in which the opening area of the through hole 21 can be sufficiently enlarged.

The water-absorbing sheet 40 is disposed under the partition portion 20. Thus, urine accumulating in the body portion 10 can be confined in the water-absorbing sheet 40. For this reason, it is possible to ease generation of malodors caused by the urine accumulating in the body portion 10.

The animal toilet 1 is provided with the drawer portion 14 that is capable of being inserted in and extracted from the body portion 10. Thus, it is possible to easily carry out the work of replacing a used water-absorbing sheet 40 with a new one.

The present invention is not limited to the above-described embodiment, and various modifications can be made. In the above-described embodiment, the partition portion 20 may include a fixing means for temporarily fixing the member 24 to the member 22. As the fixing means, a fastening tool 26 can be used, for example, as shown in FIG. 15. In this example, the fastening tool 26 is a bolt. In FIG. 15, the support part 22b of the member 22 is provided with a hole through which the bolt passes. A female screw that is screwed to a male screw of the bolt is formed in the inner surface of the hole. The member 24 can be fixed to the member 22 at an arbitrary position by fastening the bolt to press the tip of the bolt to the side surface of the member 24. Also, the fixing state can be released by loosening the bolt to separate the tip of the bolt from the side surface of the member 24. The fastening tool 26 is preferably such a fastening tool that its fastening and loosening work can be carried out only by hands without another tool such as a spanner being used. Providing the fixing means makes it possible to avoid a situation in which the member 24 is displaced unexpectedly when the animal toilet 1 is used. Moreover, using the fastening tool 26 as the fixing means makes it possible to realize the fixing means with simple constitution.

In the above-described embodiment, an example is given in which the member 24 is displaceable in only its longitudinal direction. However, the member 24 may be displaceable in only its short-length direction. In that case, the support part 22b is connected to the short side of the plate-shaped part 22a. Also, the projecting part 22c is connected to the long side of the plate-shaped part 22a.

In the above-described embodiment, an example is given in which the plan shape of the hole 23 is a circle. However, the plan shape of the hole 23 is arbitrary, and may be, for example, a polygon such as a rectangle, or an ellipse. The same shall apply to the hole 25.

In the above-described embodiment, an example is given in which the drawer portion 14 is provided. However, it is not essential to provide the drawer portion 14. In the case where the drawer portion 14 is not provided, the water-absorbing sheet 40 is disposed directly on the bottom face part 10a. In that case, the side face part 10b is not provided with the opening 12 naturally.

In the above-described embodiment, an example is given in which the water-absorbing sheet 40 is disposed in the body portion 10. However, it is not essential to dispose the water-absorbing sheet 40 in the body portion 10. In the case where the water-absorbing sheet 40 is not disposed, the drawer portion 14 is also not provided.

LIST OF REFERENCE NUMERALS

1 Animal Toilet
10 Body Portion
10a Bottom Face Part
10b Side Face Part
10c Overhanging Part
12 Opening
14 Drawer Portion
15 Grip
20 Partition Portion
21 Through Hole
22 Member (First Member)
22a Plate-shaped Part
22b Support Part
22c Projecting Part (Limitation Means)
23 Hole (First Hole)
24 Member (Second Member)
25 Hole (Second Hole)
26 Fastening Tool (Fixing Means)
30 Grain
40 Water-Absorbing Sheet
S1 Upper Space
S2 Lower Space

The invention claimed is:

1. An animal toilet comprising:
a body portion that has a bottom face part and a side face part, and is in a box shape; and
a partition portion that has a through hole allowing urine to pass therethrough, and divides an inside of the body portion vertically,
wherein an opening area of the through hole is variable,
wherein the partition portion includes a first member in which a first hole is formed, and a second member in which a second hole that constitutes the through hole together with the first hole is formed,
wherein the second member is displaceable relative to the first member in a state of overlapping with the first member,
wherein the first member includes:
a plate-shaped part that is a part in a plate shape in which the first hole is formed; and
a support part that is continuous with the plate-shaped part, and supports the second member,
wherein the second member has a non-facing surface that is a surface opposite to a surface facing the first member, and
wherein the support part supports the second member such that the support part covers the second member from a side surface of the second member to the non-facing surface.

2. The animal toilet according to claim 1,
wherein the second member is displaceable relative to the first member in only one direction.

3. The animal toilet according to claim 2,
wherein the second member is in an approximately rectangular shape in plan view, and
the one direction is equal to a longitudinal direction or a short-length direction of the second member.

4. The animal toilet according to claim 1,
wherein the second member overlaps with the first member such that the second hole is located under the first hole.

5. The animal toilet according to claim 4,
wherein the second member does not protrude from the first member in plan view.

6. The animal toilet according to claim 5,
wherein the second member is smaller than the first member in plan view.

7. The animal toilet according to claim 1,
wherein the partition member includes a limitation means for limiting a movable range of the second member relative to the first member.

8. The animal toilet according to claim 7, wherein the limitation means is a projecting part that projects from an edge part of the first member toward the second member.

9. The animal toilet according to claim 1, wherein the partition portion includes a fixing means for temporarily fixing the second member to the first member.

10. The animal toilet according to claim 9, wherein the fixing means is a fastening tool.

11. The animal toilet according to claim 1, wherein the partition portion has n said through holes (n represents an integer of 2 or more), the first member has n said first holes, and the second member has n said second holes.

12. The animal toilet according to claim 1, wherein the partition portion is not fixed to the body portion.

13. The animal toilet according to claim 12, wherein the body portion has an overhanging part that is provided so as to overhang from the side face part toward the inside of the body portion, and the partition portion is placed on the overhanging part.

14. The animal toilet according to claim 1, further comprising:
a plurality of grains that are disposed on the partition portion, and have a water-repellent property.

15. The animal toilet according to claim 14, wherein a particle diameter of each of the grains is larger than 15 mm.

16. The animal toilet according to claim 1, further comprising:
a water-absorbing sheet that is disposed under the partition portion, and absorbs the urine having passed through the through hole.

17. The animal toilet according to claim 16, further comprising:
a drawer portion that houses the water-absorbing sheet,
wherein an opening is formed in the side face part of the body portion, and
the drawer portion is capable of being inserted in and extracted from the body portion through the opening.

* * * * *